United States Patent [19]

Schanstra

[11] Patent Number: 5,119,548

[45] Date of Patent: Jun. 9, 1992

[54] AUTOMATIC SCREW AND WASHER ASSEMBLY MACHINE

[75] Inventor: James Schanstra, Rockford, Ill.

[73] Assignee: Fastener Technology, Inc., Rockford, Ill.

[21] Appl. No.: 461,996

[22] Filed: Jan. 8, 1990

[51] Int. Cl.$^5$ .................... B23P 21/00; B23P 19/08
[52] U.S. Cl. ........................................ 29/786; 460/4; 460/46
[58] Field of Search .................. 10/155 R, 155 A, 169; 29/785, 786, 793, 794

[56] References Cited

U.S. PATENT DOCUMENTS

| | | | |
|---|---|---|---|
| 2,273,782 | 2/1942 | Irwin | 10/155 A |
| 3,622,039 | 11/1971 | Lindstrom | 221/10 |
| 3,750,206 | 8/1973 | Pomernacki | 10/155 A |
| 4,058,866 | 11/1977 | Foster | 10/155 A |
| 4,453,308 | 6/1984 | Jackson | 29/785 |

FOREIGN PATENT DOCUMENTS 916140  1/1963  United Kingdom ............ 10/155 A

Primary Examiner—Lowell A. Larson
Assistant Examiner—Michael J. McKeon
Attorney, Agent, or Firm—Laff, Whitesel, Conte & Saret

[57] ABSTRACT

An automatic manufacturing machine puts a washer on a bolt which thereby forms a sub-assembly that can be used to further manufacture other things, for example. A vibrating bowl orients the washers so that one side of the washer is up and the other side is down relative to said bolt. These oriented washers are then delivered to a washer transporting dial having a plurality of equi-spaced pockets around the periphery thereof. Each pocket receives and carries one of the oriented washers to eventually receive the bolt. A sensor detects whether the washer is correctly positioned in the pocket and stops the vibrating bowl until an improperly washer is correctly positioned in a pocket. Jets of air are directed onto the surface of the dial to dislodge incorrectly positioned washers. This invention is important when the opposite sides of the washer are different, as when it is conical, covered on one side by rubber, plastic, or the like. Since the prior art delivered washers in a random manner, on the average, the wrong side of such a washer would be up half of the time.

7 Claims, 2 Drawing Sheets

AUTOMATIC SCREW AND WASHER ASSEMBLY MACHINE

This invention relates to automatic production machines and more particularly to machines for assembling a bolt and washer by inserting the shank of the bolt through the hole in the washer.

Reference is made to U.S. Pat. Nos. 3,750,206 and 3,896,539 which show an automatic production machine for inserting a bolt through the hole in a washer. Like earlier machines, these patents show a series of dials which rotate simultaneously and in synchronism, much as a series or train of three meshing gears may rotate together. At one end of the series, an outside dial picks up bolts and presents them one at a time to the middle or assembly dial. At the other end of the series, a second outside or washer dial picks up washers, and also presents them one at a time to the middle or assembly dial. As the bolts and washers are so presented to the assembly dial, the shank of a bolt passes through the hole in the middle of a washer, thus making an assembly which may later be used as a unit in future manufacture.

The two above identified patents add to this combination, an automatic washer feeder which is called a "cascade" feeder in the patents and sometimes called a "waterfall" feeder in the industry. The cascade feeder simply dumps a quantity of washers on the second outside or washer dial. As this cascade of washers floods over the washer dial, some of them fall into proper loading positions (called "pockets"), around the perimeter of the washer dial. The rest of the washers are swept off the washer dial and into a recirculation path which caused them to once again cascade across the dial.

As long as the washers are simple, flat iron or steel rings, this cascade feeder does a good job. However, it is not suitable for feeding more sophisticated washers. For example, some washers have a top and a bottom side, such as a concave or convex washer, a washer with a rubber or plastic coating on one side, some forms of lock washers, etc. Since the cascade feeder does not discriminate between the top and bottom of the washer, each side of the washer may be "up" on a purely random basis. Statistically speaking, then, if there is a right and a wrong side, it is probably that the cascade feeder will deliver the "wrong" side of a washer 50% of the time.

For these and other reasons, a purely random feeder, such as the cascade feeder, sometimes has rather seven limitations. Therefore, a more sophisticated approach is desirable. The need for better feeders will become more acute as newer and more sophisticated materials and designs become available.

Accordingly, an object of this invention is to provide new and improved machines of the above described type. Here, an object is to avoid the randomness of washer orientation which is inherent in cascade feeders. In this connection, an object of the invention is to first orient washers, and then to feed them one at a time to an assembly position, so that a recirculation of washers is not necessary.

Another object of the invention is to accommodate newer materials and more modern washer design, both now and as they become available in the future.

In keeping with an aspect of the invention, these and other objects are accomplished by providing a vibration feeder which orients the washers and presents them, one at a time, to the outside or washer dial. The washers are so presented at a rate which coincides with the rate at which the assembly dial utilizes them to make the bolt and washer combination. A sensor detects each washer and its acceptance into a desired pocket or work position on the washer dial. The sensor also detects when the washers come too fast or if a washer fails to be properly positioned and is drifting around on the top of the dial. The vibration feeder then shuts down responsive to a sensor's command until there is a need for the next washer, at which time the vibrator resumes its delivery of the washers. If two washers are stacked in the same pocket or work position, a jet of air dislodges one of them. If the dislodged washer does not lodge in another pocket or find a new work position, the vibration feeder shuts down again until it does find a position.

A preferred embodiment of the invention is shown in the attached drawings, wherein:

FIG. 3 shows the sub-assembly of a bolt and a washer.

Figure 1:
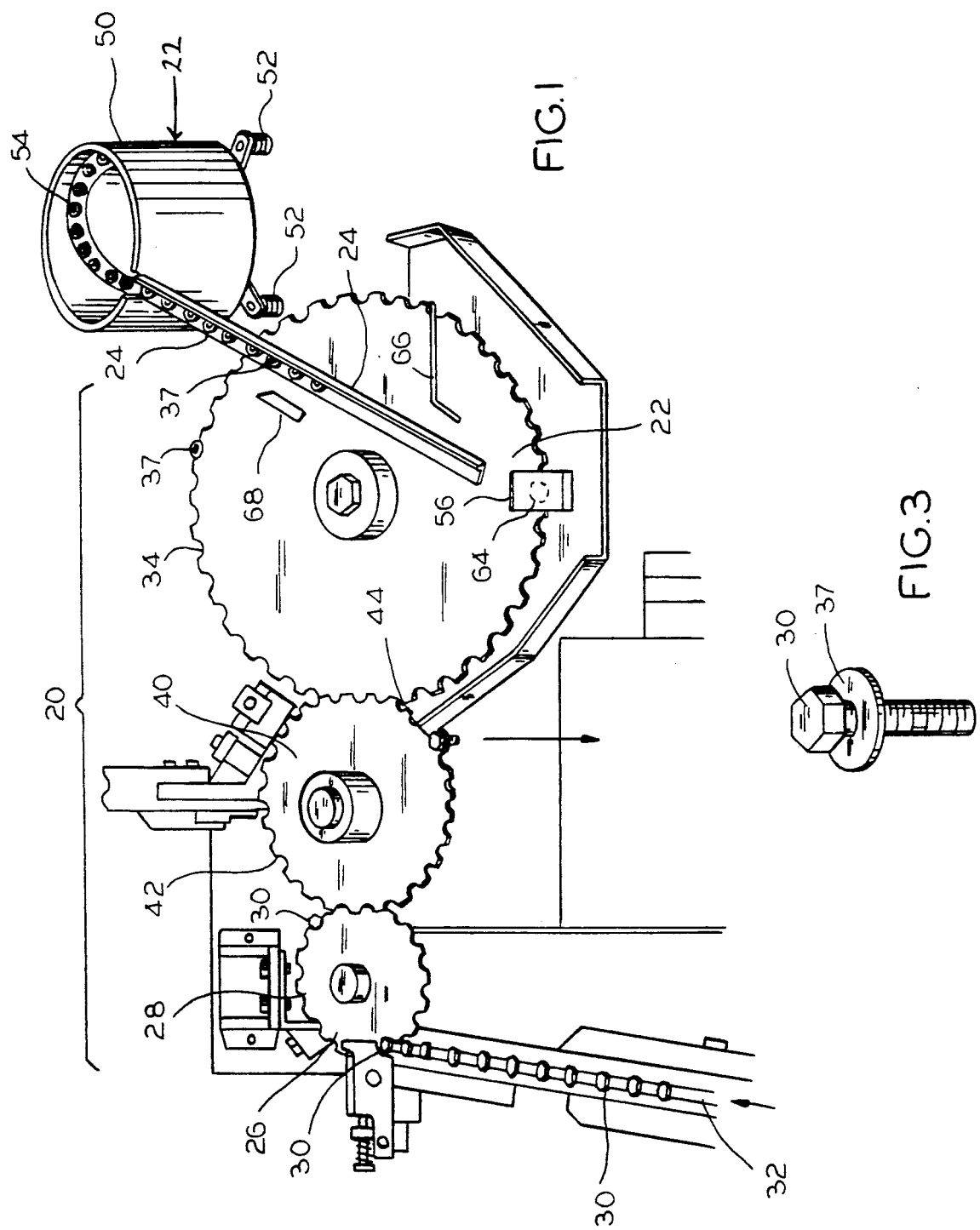
FIG. 1 is a perspective view of the inventive machine.

The principle components of the invention (FIG. 1) are a series 20 of three dials, a vibrational feeder 22, and a washer delivery track 24. The three dials 20 rotate in synchronized unison, much as a train of three meshing gears would rotate in synchronized unison. In the series 20, the first outside or bolt dial 26 has a peripheral series of work positions or pockets 28 which pick up bolts 30 one at a time from any suitable magazine 32. Each pocket on dial 26 carries one bolt, head up, shank down toward a center or assembly dial 40. The second outside or washer dial 34 has a peripheral series of work positions or pockets 36 which receive the washers, one washer 37 in each pocket 36.

Each of these two outside dials 26, 34 presents its product (i.e. the bolt 30 and washer 37) to the central or assembly disk 40. As each washer carried in a pocket 36 on washer dial 34 reaches a point where it meshes with a corresponding pocket 42 on the periphery of the center or assembly dial 40, the washer is transferred from dial 34 to dial 40. The center dial 40 then carries the washer 37 to a point where it confronts a pocket 28 on the outside or bolt dial 26. There, a bolt being carried by dial 26 is inserted through a hole in the washer. At an appropriate place in the rotation of assembly dial 40, the subassembly of a bolt and washer 44 (FIG. 3) is discharged from the pocket on the center dial 40.

For more information about the machine which has been described thus far, reference may be had to the above identified two U.S. Pat. Nos. 3,750,206 and 3,896,539.

The invention provides a vibration feeder 22 which is a known device having a bowl 50 mounted on suitable shock mounts 52 which permit the bowl to vibrate. When a motor 62 (FIG. 2) is operating, the bowl 50 vibrates in a predetermined manner. A spiral track 54 is formed inside the bowl 50 and integrally attached to or formed on the interior wall thereof. Track 54 leads from the bottom of the bowl, around the side, out the top of the bowl, and into a delivery chute 24.

The track 54 is given a contour such that all washers which are not in the desired orientation fall back into the bowl. Those who are skilled in the art know how to form such a contour in order to orient something having a size that fits onto the track. Primarily, this contouring is done by watching the product move up the track.

Then, at suitable points, the track is filed away to remove the support for all products in any except for the desired orientation. At the top of the spiral track, all of the washers are oriented with a selected top side up, if there is a difference between the sides. If there is no difference, the washers are still oriented, but either side may be "up".

Figure 2:
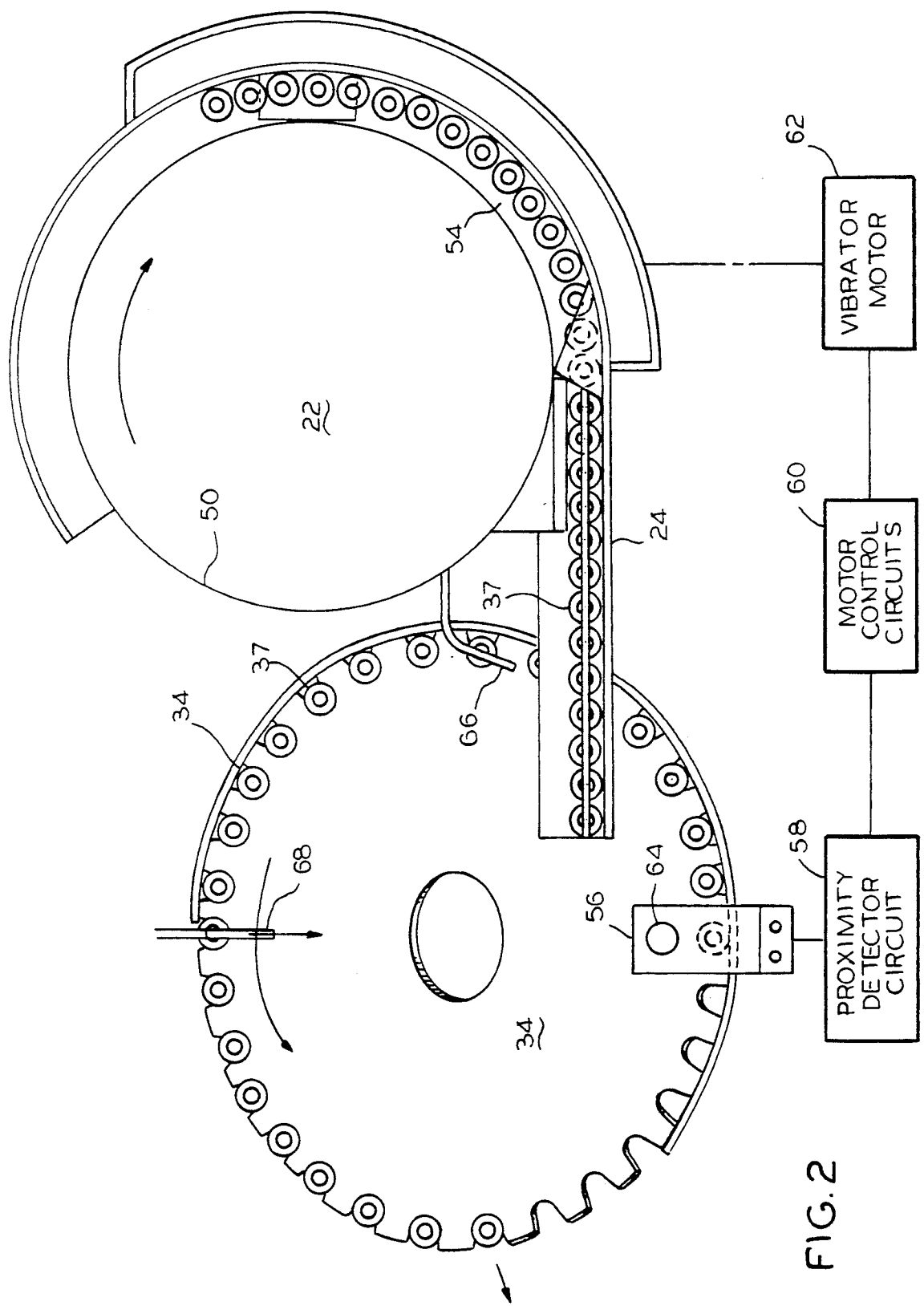
FIG. 2 is a top plan view of the inventive automatic feeder and washer dial.

FIG. 2 shows the relationship between the outside or washer dial 34 and the vibration feeder 22. Each washer 37 is deposited on track or chute 24 which delivers them one at a time to the dial plate 34. The end of the chute 24 is over the dial 34 in a position where gravity causes the washers to fall into a pocket.

The vibration rate of bowl 22 is coordinated with the rotational speed of the washer dial 34. Therefore, the washers are dropped from chute 24 and onto the dial 34 as they are needed to fill the pockets or work positions 34 which are equispaced around the perimeter of the dial plate. Ideally, a washer would never be deposited on dial 34 unless there is an available empty pocket to fill. Likewise except for that pocket, ideally there would be no unfilled pocket between a washer loading position and the transfer position where the washer is moved from washer dial 34 to the center assembly dial 40.

At least the dial plate 34 is setting at an angle, with respect to both horizontal and vertical, to that gravity causes the washer to slide toward the empty pocket which is then to be filled.

Extending over the periphery of washer dial 34 and in the vicinity of the pocket to be filled, is a pocket full sensor 56. This is a proximity sensor controlled by circuit 58 to detect the presence of an object by the manner in which it changes a capitance coupling between the object and sensor. For present purposes, sensor 56 may be thought of as a copper plate suspended over the dial. If a washer is present, there is a layer of air having a discrete thickness between the copper plate and the washer. If the washer is absent, the layer of air is much thicker. If two washers are stacked one on top of the other, the layer of air is much thinner. Since capacitance depends upon the dielectric between two plates (i.e. the thickness of the layer of air), it is easy to detect the presence, absence, or doubling of washers on the center dial 34.

Accordingly, as the capacity changes at the proximity sensor 56, the detector circuit 58 responds in order to signal the prevailing condition to a motor control circuit 60. This circuit may control the entire machine. Depending upon the instant needs, control circuit 60 also operates or shuts off the vibrator motor 62 to feed or stop the delivery of the washers to the washer dial 34. Thus, for example, if an extra washer 64 is unable to reach a pocket which is already full, the vibrator 22 shuts down until the washer finds its way into the next available empty pocket.

Two air jets 66, 68 are provided between sensor 56 and the unload position represented by arrow A to guide and direct the washers into the region of the empty pockets. Air jet 66 also acts with a force which is sufficient to dislodge a second washer, if two washers should be stacked on top of each other in one of the pockets 34.

Those who are skilled in the art will readily perceive how to modify the invention. Therefore, the appended claims are to be construed to cover all equivalent structures which fall within the true scope and spirit of the invention.

What is claimed is:

1. An automatic machine for joining parts to make a sub-assembly of said parts, at least one of said parts having a top side and a bottom side said machine comprising a meshing series of two outside and at least one central dials mounted to rotate simultaneously and synchronously; peripheries of said dials being shaped and dimensioned to provide a plurality of work positions for receiving, transporting, and delivering individual parts as they are received one at a time in a predetermined orientation from sources of such parts to a central one of said series of dials; said predetermined orientation including placing said top sides of said at least one of said parts in an up position; vibrating bowl means for individually delivering said at least one of said parts one at a time and in said predetermined orientation, a chute for delivering the output of said vibrating bowl means in said predetermined orientation to said one outside dial, said one outside dial picking up said delivered parts as said work positions become empty and available to pick up and carry said delivered parts, said picked up parts remaining in said predetermined orientation while being carried by said one outside dial; and means comprising a central one of said dials for receiving parts from both of said outside dials and for joining the individual ones of said parts to form said sub-assembly.

2. The machine of claim 1 wherein said work positions comprises a plurality of equispaced pockets formed around the periphery of each of said dials, and each of said pockets being shaped and dimensioned to receive a corresponding one of said parts in predetermined orientations, whereby a rotation of said outside dials carries said parts to and presents them in said predetermined orientation to said pockets formed around the periphery of said central disk.

3. The machine of claim 1 wherein an end of said chute is positioned to deposit said one parts at a point on said one outside dial where said deposited parts will fall into empty pockets on said one outside dial.

4. The machine of claim 3 and a means for sensing a part which does not find its way into an empty one of said pockets on said one outside dial, and means responsive to the sensing means for shutting down the vibrating bowl until said sensed part finds its way into an empty pocket on said one outside dial.

5. The machine of claim 3 and means for sensing a double loading of parts in a single empty pocket on said one outside dial, and means responsive to said sensing means for dislodging one of said double loaded parts leaving the other of said double loaded parts in position.

6. The machine of one of the claims 4 or 5 and at least one air jet for driving any of said parts which is not properly lodged in an empty pocket on said one outside dial, at least said one outside dial being oriented so that gravity causes said driven part to find its way into an empty one of said parts.

7. The machine of one of the claims 4 or 5 wherein said sensor is a proximity sensor positioned adjacent the pockets on said outside one dial.

* * * * *